Feb. 23, 1937.  C. G. BINGHAM  2,071,915
MACHINE FOR COATING PRINTERS' ROLLERS
Filed Sept. 11, 1933    3 Sheets-Sheet 1
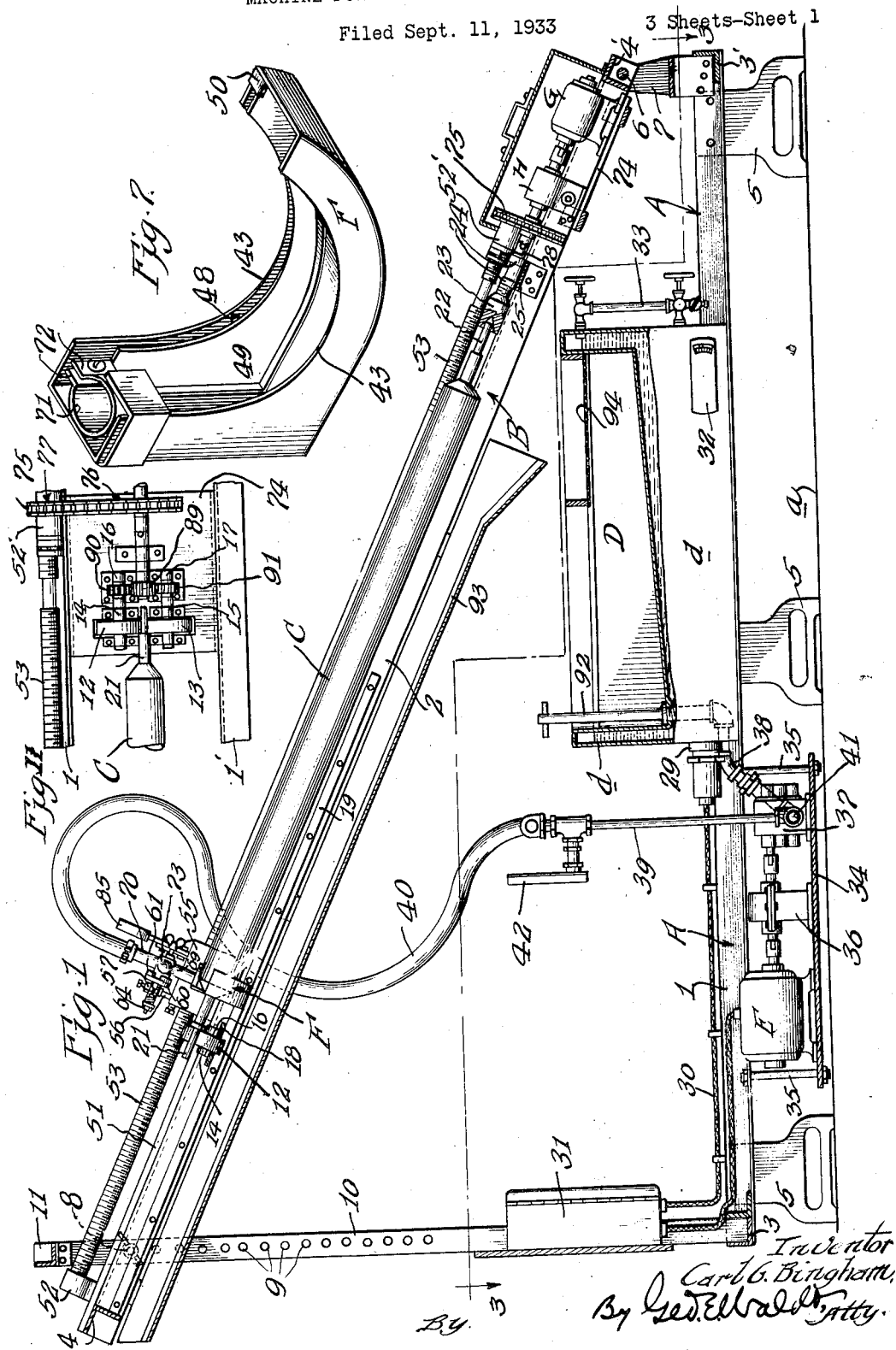
Inventor
Carl G. Bingham
By Geo. E. Waldo, Atty.

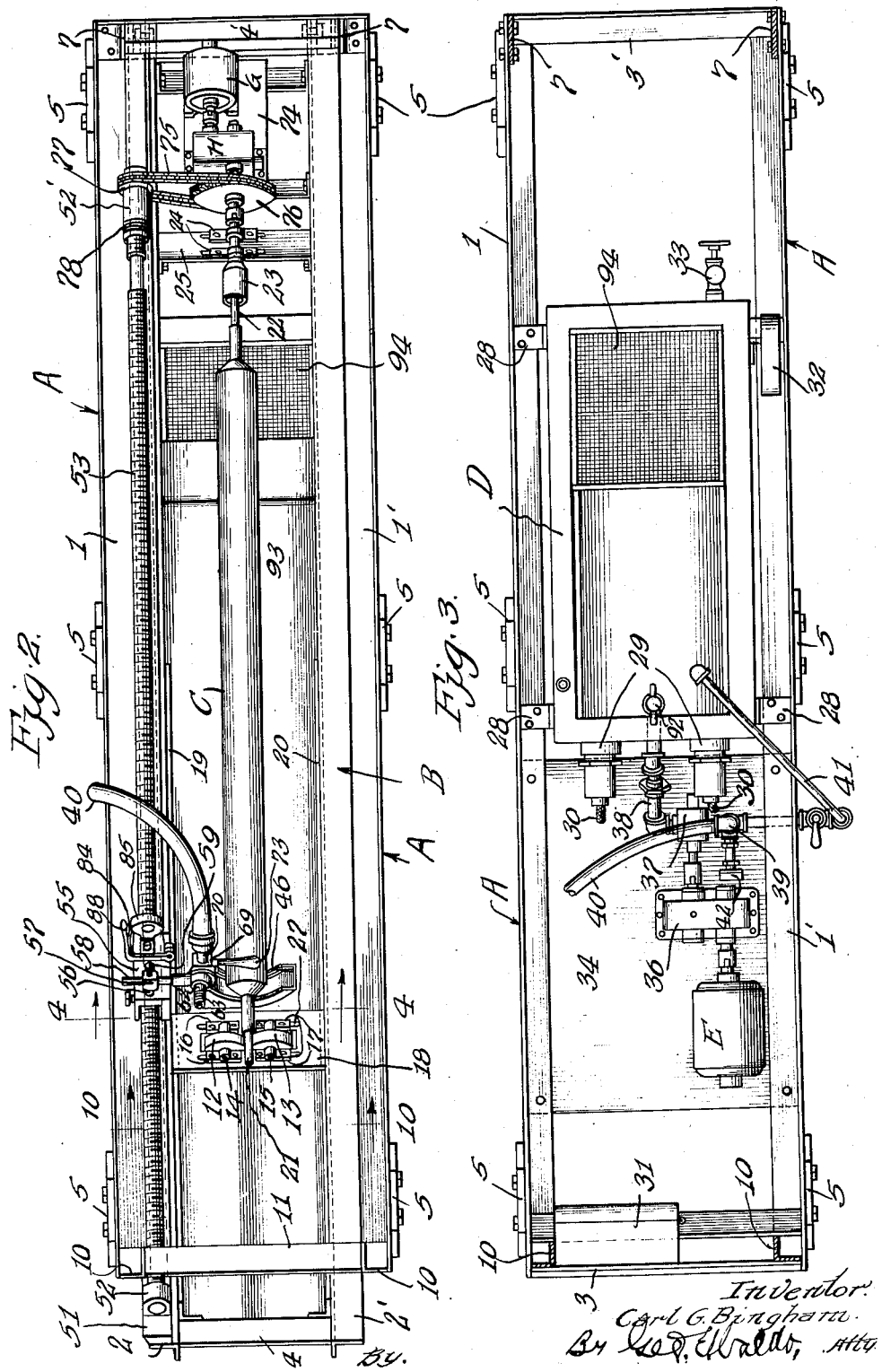

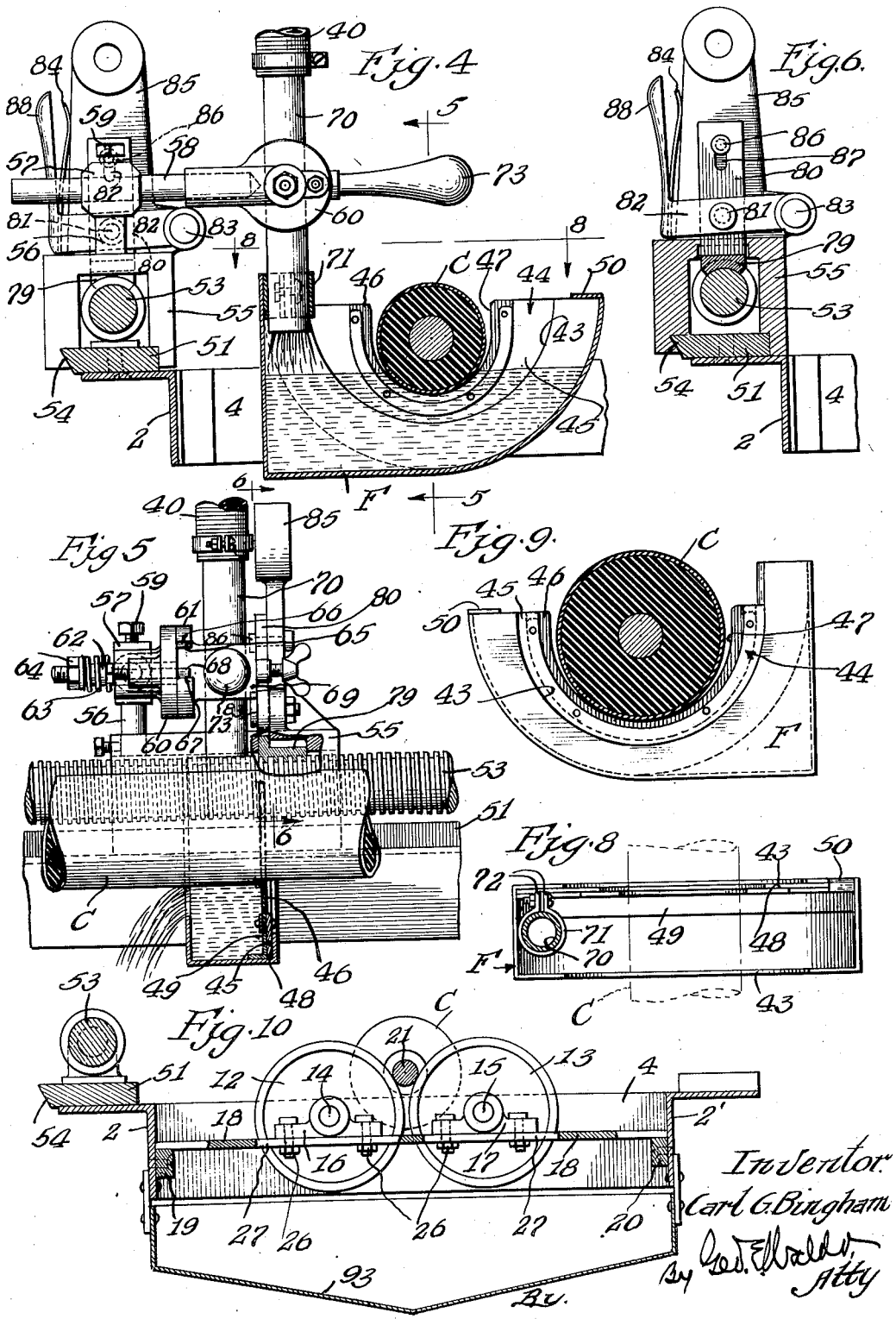

Patented Feb. 23, 1937

2,071,915

UNITED STATES PATENT OFFICE 2,071,915

MACHINE FOR COATING PRINTERS' ROLLERS

Carl G. Bingham, Highland Park, Ill., assignor to Sam'l. Bingham's Son Mfg. Co., Chicago, Ill., a corporation of Illinois Application September 11, 1933, Serial No. 688,951

8 Claims. (Cl. 91—32)

This invention relates to machines for coating printers' rollers, of the general type comprising a frame, means for rotatably supporting a roller to be coated in inclined position on said frame, a receptacle for containing roller composition provided with an opening to receive the roller to be coated, positioned in the machine and so proportioned and arranged that only a restricted portion, axially, of the surface of a roller operatively mounted in the machine will be exposed in said receptacle, and means for imparting movement to and guiding said receptacle in a path substantially parallel with the axis of the roller supporting means, downwards along the roller to be coated.

The object of the invention is to provide an improved and simplified machine for coating printers' rollers, whereby a final, relatively thin coating of renewable coating composition of more uniform thickness may be applied to said roller, more quickly and at less expense than with any other machine or apparatus of which I have any present knowledge.

To effect the objects thereof, a machine embodying my invention and improvements comprises the various features, combinations of features and details of construction hereinafter described and claimed.

In the accompanying drawings, in which the invention is fully illustrated,

Fig. 1 is a side elevation of a machine embodying my invention and improvements, viewed from a position below Fig. 2, parts thereof being shown in substantially vertical, central section.

Fig. 2 is a top plan view of the machine.

Fig. 3 is a top plan view of the base section of the machine from the position 3—3 of Fig. 1.

Fig. 4 is an enlarged, fragmentary, sectional view of the machine on the line 4—4 of Fig. 2.

Fig. 5 is a fragmentary, detail view on the line 5—5 of Fig. 4.

Fig. 6 is a fragmentary view substantially on the line 6—6 of Fig. 5.

Fig. 7 is a detached, perspective view of the receptacle for containing coating composition.

Fig. 8 is a top plan view of the composition receptacle from the position 8—8 of Fig. 4, with the composition supply pipe shown in section.

Fig. 9 is a view of the composition receptacle, substantially as shown in Fig. 4, showing its adaptation for coating rollers of different sizes.

Fig. 10 is a sectional end view on the line and from the position 10—10 of Fig. 2; and Fig. 11 is a fragmentary, detail, plan view illustrating modified means for mounting the roller in the machine at its lower end.

Describing the invention with reference to the drawings, the operative parts of the machine are mounted on a suitable frame, which, as shown comprises a base section designated as a whole A, and an upper section designated as a whole B, supported on said base section A, both of which are substantially rectangular in shape, comprising longitudinal side members 1, 1' and 2, 2', and end members 3, 3' and 4, 4', which are rigidly connected to and rigidly connect the side frame members, respectively.

Said frame sections A and B may conveniently and economically be built up from suitable structural shapes—as angle bars—which may be purchased commercially, and the different side members thereof bolted, riveted, welded or otherwise secured together, in accordance with desired practice to form structures suitably proportioned for their designed purpose. As shown, the base section A is supported on legs 5, which may rest on the floor or other suitable support, the line of which is indicated at $a$, Fig. 1, while the upper frame section B is supported on said base section, preferably in inclined position and by means which permit of varying its inclination. In the preferable construction shown, the lower end of the upper frame section B is pivoted to a rod 6 secured in holes formed in the upper ends of upright standards 7 secured to opposite sides of the base section A, as shown. At its upper end, said pivoted frame section B is supported by a rod 8 which is interchangeable in holes 9 formed in upright standards 10 secured to opposite sides of the base section A of the machine frame at the end thereof remote from the pivot 6, the upper ends of said standards being rigidly connected by a transverse brace member, as shown by an angle bar 11.

In operation, a roller to be coated designated as a whole C, is adapted to be rotatably mounted in the upper frame section B, simple and desirable means for this purpose being as follows: At its upper end, the roller C is rotatably mounted by means of anti-friction rollers 12 and 13, which are secured to shafts 14 and 15 rotatably mounted in bearings formed in bearing blocks 16 and 17 mounted in spaced pairs on a plate 18 which, as shown, rests on guides 19 and 20 secured to the inner sides of the longitudinal frame members 2, 2', of said upper frame section B, the upper end of the stock or shaft 21 of the roller C which, as shown, is reduced in size, resting in the angle defined by the upper sides of said rollers, in a familiar manner.

At its lower end said roller C is rotatably mounted by engagement of the end of its stock or shaft—which, as shown, is also reduced in size—with an inwardly tapered socket 22 formed in a bearing support 23, which, as shown, is formed on a shank rotatably mounted in bearings formed in lugs or brackets 24 adjustably mounted on a plate 25 secured to the side frame members 2, 2', of the pivoted upper frame section B, see Figs. 1 and 2.

The plate 18 provides convenient means for quickly and conveniently adjusting the supporting rollers 12 and 13 towards and from the lower bearing support 23, to adapt the machine for coating rollers of different lengths.

It is found in practice that within contemplated maximum inclination of the frame member B to the horizontal, the plate 18 will retain its position on the supporting guides 19 and 20 by friction due to gravity, without other supporting means.

To provide for adjusting the positions of the rollers C in the machine, to effect approximate parallelism of the axis of a roller mounted in the machine with the path of movement of the receptacle for coating composition, presently described, the bearing blocks 16 and 17 are separately transversely adjustable on the plate 18. As best shown in Figs. 2 and 10, this is effected in a simple manner by securing said bearing blocks to said plate by bolts 26 which extend through slots 27 formed transversely of the machine in said plate 18. With the described construction, it is obvious that by adjusting said bearing blocks towards or from each other the end of the roller C supported by the rollers 12 and 13 may be raised or lowered, as the case may be, while by adjusting said supporting rollers laterally in the same direction, the upper end of the roller C to be coated will be moved laterally one way or the other, as the case may be. However, as will hereinafter appear, a particular advantage inherent in my improved machine is that the quality of the work produced is not dependent on exact parallelism of the axis of said roller C with the path of movement of the coating receptacle, as, within limits, an equally good coating will be produced with said roller C and composition receptacle "off-center" relative to each other. Obviously, due to this characteristic, a considerable saving of time is effected in mounting rollers C in the machine compared with the time required if any considerable nicety of adjustment of the rollers to be coated relative to the path of movement of the composition receptacle is necessary.

Mounted on the lower frame section A by brackets 28 is a water-jacketed pan or tank designated as a whole D, adapted for containing composition for coating the rollers C and for melting the same and maintaining it at a temperature corresponding to contemplated fluidity of said composition. In the preferable construction indicated in the drawings, the pan or tank D is electrically heated by means of rheostats, indicated at 29, which are electrically connected by conductors 30 with a switch box indicated at 31 which, in turn, is controlled by a thermostat indicated at 32 mounted in the water-jacket d of the pan or tank D. As shown, also, the pan or tank D is equipped with a gauge 33 arranged to indicate the water level in the jacket d of said pan. All of the control means associated with the pan or tank D are old and well known and devices suitable for the purpose can be purchased commercially and installed by skilled electricians and need not, therefore, be described in detail.

Also mounted on a plate 34 suspended by bolts 35 from the side members 1, 1', of the base section A of the machine is an electric motor indicated at E, which is connected by a speed-reducing gear, indicated at 36, with a pump indicated at 37, the suction side of said pump being connected by a pipe 38 with the bottom of the tank D, and the discharge side of said pump having, as shown, pipe and hose connections 39 and 40 arranged for supplying molten coating composition to the composition receptacle, by which it is applied to the roller C mounted in operative position in the machine frame, as hereinafter fully described.

As shown, also, the pump 37 is equipped with a valve controlled by-pass connection indicated at 41, by means of which molten coating composition drawn from the pan D by said pump may be returned to said pan without stopping the pump.

As is well known to persons familiar with the art of coating printers' rollers, it is very important that the coating material shall be applied to the rollers at a temperature corresponding to proper consistency of said material and, to indicate the temperature of the molten coating composition applied to said roller, a thermometer indicated at 42 is connected into the pipe 39 which connects the pump 37 with the receptacle for applying coating material to the roller C.

Motors, pumps, speed-reducing gears and associated devices suitable for use as parts of my improved machine, can be purchased commercially and installed by skilled mechanics without the exercise of invention and they are not, therefore, either shown or described in detail.

In accordance with the present invention, coating composition is applied to the roller C rotatably mounted in the upper frame section B of the machine, in the manner heretofore described, by means of a receptacle for containing coating composition, designated as a whole F, to which, in operation, movement lengthwise of said roller is adapted to be imparted by suitable means provided for the purpose, all as hereinafter particularly described and pointed out. What I now consider a preferable form of composition receptacle is shown in Figs. 4, 5, 8 and 9 of the drawings, which, excepting as regards certain details of construction hereinafter particularly described, will readily be understood from an examination of the drawings.

Stated generally, said receptacle is trough-shaped and may conveniently and economically be made from suitable sheet metal. In operation, said receptacle is mounted on the upper frame section B, transversely beneath the roller C to be coated, and is proportioned so that only a restricted portion, axially of the roller, will be exposed therein.

As shown, also, both end walls or flanges of said receptacle are cut away, as shown at 43, on curved lines, which may and preferably will be, approximately, the arcs of circles, the radii of which are considerably longer than that of the roller to be coated and the centers of which, as installed for use, are positioned above the center of a roller to be coated, mounted in the machine, and the relation preferably being such that the following flange of said receptacle will be higher than the leading flange, and the relation being such, also, that, as installed for use, the edges of both flanges will be spaced from the surface of the roller C to be coated, as clearly shown in Fig. 5. In accordance with the invention, the space separating the curved edge 43 of the leading flange from the surface of the roller C is adapted to be closed to prevent leakage of molten coating composition from the receptacle F at the leading side thereof, in operation, by means of what may be designated a sealing plate 44, comprising, as shown, a metal plate 45 adapted to be removably secured to the leading flange of the receptacle, the inner edge of which extends inwardly beyond the inner edge of said flange, as shown, see Fig. 4, and secured to the inner edge of said removable plate 45 is a segmental sealing ring 46 of suitable flexible material, preferably sheet rubber, which is cut out substantially as shown at 47, the relation preferably being such that, as installed for use, the cut-out edge of said flexible ring will contact lightly with the under side of the roller C mounted in the machine and will diverge gradually upwards therefrom, at both sides, as shown.

As shown, also, the sealing plate 44 is removably secured in position in the receptacle F by frictional engagement of the sheet metal portion 45 thereof with a groove 48 formed between the leading flange of said receptacle and a flange of an angle plate 49 secured to the bottom of the said receptacle in spaced relation to the leading flange thereof.

The position of the sealing plate 44 in the receptacle F is defined by contact of an end of the metal portion 45 thereof with a stop which extends over an end of the grove 48, as shown at 50, Figs. 4, 8 and 9.

With the construction described, it is obvious that by providing a number of sealing plates 44 of different sizes constructed as described and which are interchangeable in the groove 48, the machine may readily be adapted for coating rollers of different diameters.

On the other hand, the space separating the arcuate inner edge of the following flange of the receptacle F and the surface of a roller in the machine is unobstructed, as best shown in Fig. 5, thus permitting the free discharge of excess molten coating composition from said receptacle.

As shown, the receptacle F is mounted in the machine by means as follows:—Secured to the upper side of the frame member 2 of the upper frame section B, by suitable means, as screws, is a guide bar 51, and rotatably mounted in bearings 52, 52', secured to opposite ends of and in spaced relation to said bar is a screw 53, said bearings being constructed to hold said screw from endwise movement.

Slidably mounted on the guide bar 51, preferably by means of a dovetail bearing, as shown at 54, Figs. 4, 6 and 10, is a block or carriage 55, on which the receptacle F is supported directly, said supporting means being as follows:—Secured in said carriage 55 is an upright stud 56, formed at the upper end of which is a head 57 provided with a transverse hole, fitted to which, so as to be adjustable endwise therein, is a rod 58, which is adapted to be secured in different adjusted positions by a set screw 59, and secured in fixed position to the end of said rod which projects inwardly from said block or carriage 55, is a disk 60, by which a second disk 61 is pivotally supported by means of a stud 62 formed on said disk 61 which is fitted to and extends through an axial bearing formed in said fixed disk 60, the adjacent faces of said disks 60 and 61 being maintained in frictional engagement with each other by a coil spring 63 adjusted over the end of the stud 62 which projects through the hole in the fixed disk 60 and which reacts between a fixed part of said disk and a nut 64 threaded to the projecting end of said stud 62. The spring 63 is calibrated so that, in operation, the disk 61 with its normal load, represented by the weight of the receptacle F and its contents, will be held from turning by frictional engagement with the fixed disk 60, but may be turned manually, if desired. As shown, also, turning movement of the disk 61 is limited as follows:—A sector of the disk 61 is cut away, as shown at 65, Fig. 5, forming opposed shoulders 66 and 67 thereon, and secured in the disk 60 is a stud 68 which projects into the space between said shoulders 66 and 67. The nut 64 provides means for adjusting the tension of the spring 63 and thus the frictional engagement of the disks 60 and 61.

Also formed on the rotatably supported disk 61 is a boss 69 provided with a hole to receive a pipe section 70 to which the discharge end of the hose 40 for supplying coating composition to the coating receptacle F is adapted to be connected.

As shown, the receptacle for coating composition is secured to the end of the pipe section 70 other than that to which the hose 40 is connected, simple means for the purpose consisting of a split metal band 71 secured to the top edge of said receptacle, as shown, the ends of which are connected by a headed bolt, which extends through ears 72 formed at the ends of said band, providing means for clamping said receptacle to the end of said pipe.

As shown, also, said pipe section 70 is adjustable endwise in the hole in the boss 69 and is adapted to be secured in different adjustable positions therein by means of a set screw threaded through said boss.

Also secured in the boss 69 is a handle 73, which provides convenient means for manipulating the receptacle F.

In operation, rotation is adapted to be imparted to the bearing support 23 for the lower end of the roller C to be coated, and to the screw 53 by means as follows:—Mounted on a plate 74 secured to the lower end of the upper frame section B is a motor, indicated at G, from which the shank of the bearing support 23 is driven by means of a reducing gear, indicated at H. As shown, also, the screw 53 is driven from said reducing gear by means of a chain belt 75 adjusted to sprocket wheels 76 and 77, secured to the driving shaft of the reducing gear H and to the screw 53, respectively, see Figs. 1 and 2. The thrust of the screw 53 and associated parts is sustained by an anti-friction bearing indicated at 78.

As shown, the carriage 55 and thus the composition receptacle F are adapted to be fed downwards along a roller C operatively mounted in the machine, by engagement of a nut 79 supported on said carriage, adapted to engage the threads of the screw 53. As shown, see particularly Fig. 6, said nut 79 is a segmental nut and is formed on the lower end of a bar 80 pivoted at 81 to a lever 82, which, in turn, is pivoted at one end to a stud 83 on the carriage 55. Said segmental nut is maintained yieldingly in engagement with the screw 53 by a spring 84 secured to the bar 80 at a point remote from its pivot, which is arranged to react against a rigid post or projection 85 on the carriage 55, to turn the lever 82 pivotally to effect engagement of said segmental nut with the screw 53.

At its upper end the bar 80 on which the segmental nut 81 is formed, is guided by means of a headed stud 86, which is secured in the post or projection 85 and extends through a slot 87 formed in said bar. Also formed on the lever 82 is a hand grip 88, by means of which the lever 82 may be turned pivotally to disengage the nut 79 from the screw 53, as will readily be understood. Also, when said nut is disengaged from the screw 53, the rigid post or projection 85 provides convenient means for moving the carriage 55 along the bar 51.

Instead of mounting and rotating the lower end of the roller C by means of the bearing support 23, as heretofore described, the invention contemplates the use of modified means for this purpose, which consists in mounting and driving said roller C by means of anti-friction rollers, substantially in the same manner as the upper end of said roller is mounted.

This modification is shown in Fig. 11 of the drawings, in which, so far as applicable, corresponding parts are designated by the same reference characters as in Figs. 1 to 11, to-wit: C, the roller to be coated; 12 and 13, the anti-friction rollers; 14 and 15, the shafts for mounting and driving said rollers, rotatably mounted in bearing blocks 16 and 17, secured to said shafts, respectively; 74, the plate on the upper frame section B on which said bearing blocks are mounted; 75, the chain belt for driving the screw 53 adjusted to sprocket wheels secured, respectively, to the driving shaft of the reducing gear H and to the screw 53. As shown in said modification, the roller C to be coated is driven directly by a pinion 89 secured to the shaft of the reducing gear, which intermeshes with gears 90 and 91 secured, respectively, to the shafts of the anti-friction rollers 12 and 13.

In coating printers' rollers with coating composition by means of my improved machine, the initial step is to provide a supply of molten coating composition in the pan or tank D. To effect this, the discharge opening from said pan is closed by a plug 92 having a handle sufficiently long to extend above the top of said pan, said plug preferably being a screw plug, as shown, see Fig. 1. Having closed the discharge opening from said pan, a charge of cold coating composition is placed therein, and the rheostats 29 and thermostat 32 are turned on. While the coating composition is melting, a roller C to be coated may be placed in the machine, and the receptacle F for coating composition adjusted in operative relation thereto. When the composition in the pan becomes sufficiently fluid, the motor E, which drives the circulating pump 37, and the motor G which drives the roller C mounted in the machine and the screw 53 are turned on and the plug 92 removed, whereupon molten coating composition will be delivered from the pan D into the receptacle F, said motors E and G running continuously until the machine is shut down. Also, through its driving connection with the motor G, as described, the feed screw 53 will be driven continuously, which, when said nut is in engagement with said screw, will operate to impart movement to the receptacle F downwards along the roller C to be coated at a predetermined speed. As explained, however, disengagement of the nut 79 from the screw 53 may be effected at any time, by means of the hand grip 88, whereupon feeding of said receptacle will stop, while, at the same time, permitting manual manipulation thereof. In accordance with the invention, considerably more coating composition is supplied to the receptacle than is required for coating the roller in the machine, surplus material over-flowing the following flange of said receptacle into a trough 93 supported on the upper frame section B in position to catch the over-flow of coating composition from the receptacle F and to return it to the pan D for melting the coating composition, said returned composition preferably being discharged upon a screen 94 supported on the side walls of said pan above the designed level of composition therein. Said screen provides convenient means for supplying additional coating composition to the machine, to do this merely requiring that the coating composition to be added, be placed on the screen in such position that fluid composition from the trough 93 will run over it, thus, in a short time melting it, whereupon it will pass from said screen into the pan D.

I claim:

1. In combination, roller supporting means, means to rotate a roller supported thereby, a receptacle underlying a roller supported by said means, means to supply coating composition to said receptacle and means to move said receptacle along beneath a supported roller adjacent thereto, said receptacle being formed partially to embrace the periphery of a supported roller during said movement.

2. In combination, roller supporting means, means to rotate a roller supported thereby, a receptacle underlying a roller supported by said means, means to supply coating composition to said receptacle and means to move said receptacle along beneath a supported roller adjacent thereto, said receptacle being formed partially to embrace the periphery of a supported roller during said movement, said receptacle being provided with a pliable forward wall.

3. In combination roller supporting means, means to rotate a roller supported thereby, a receptacle underlying a roller supported by said means, means to supply coating composition to said receptacle and means to move said receptacle along beneath a supported roller adjacent thereto, said receptacle being formed partially to embrace the periphery of a supported roller during said movement, said receptacle being provided with interchangeable pliable walls, each of said walls having a cut out portion conforming to the contour of rollers of different diameter.

4. In combination, roller supporting means, means to rotate a roller supported thereby, a receptacle underlying a roller supported by said means, means to supply coating composition to said receptacle and means to move said receptacle along beneath a supported roller adjacent thereto, said receptacle being formed partially to embrace the periphery of a supported roller during said said movement, said receptacle being provided with a front and rear wall, said front wall being cut away to conform to the contour of a supported roller, said rear wall being also cut away and having its upper edge located beneath the upper edge of said forward wall whereby coating composition may flow thereover.

5. The method of coating a printer's roller which consists in rotatably journaling the roller in an inclined position and progressively downwardly immersing a relatively short longitudinal section of the underside only of the rotating roller in a body of melted composition.

6. The method of coating a printer's roller which consists in rotatably journaling the roller in an inclined position and progressively downwardly immersing a relatively short longitudinal section of the underside only of the rotating roller in a body of melted composition and maintaining the level of the body substantially constant relative to the axis of the roller.

7. In combination, roller supporting means, means to rotate a roller supported thereby, a receptacle underlying a roller supported by said means, means to supply coating composition to said receptacle and means to move said receptacle along beneath a supported roller adjacent thereto, said receptacle being formed partially to embrace the periphery of a supported roller during said movement, said receptacle being provided with a front and rear wall, said rear wall having at least a portion of the upper edge thereof disposed beneath the level of the coating composition within the receptacle whereby the surplus material may be discharged over said rear wall.

8. In combination, roller supporting means, means to rotate a roller supported thereby, a receptacle underlying a roller supported by said means, means to supply coating composition to said receptacle and means to move said receptacle along beneath a supported roller adjacent thereto, said receptacle being formed partially to embrace the periphery of a supported roller during said movement, said receptacle being provided with a front and rear wall, said front wall being cut away to conform to the contour of a supported roller, said front wall being pliable and arranged to contact a portion of the roller surface to prevent flow of coating composition over said wall, said rear wall having the upper edge thereof spaced from the surface of said roller and having at least a portion thereof disposed at a level lower than the surface of the composition within the receptacle whereby surplus composition within the receptacle may discharge thereover.

CARL G. BINGHAM.